Aug. 15, 1961          J. L. VOIGT          2,996,474
PROCESS OF MOLDING A MIXTURE OF AT LEAST TWO FIBER FORMING LINEAR
CONDENSATION PRODUCTS, AT LEAST ONE OF WHICH PRODUCTS
CONTAINS A HIGH TEMPERATURE THICKENING AGENT
Filed April 10, 1956
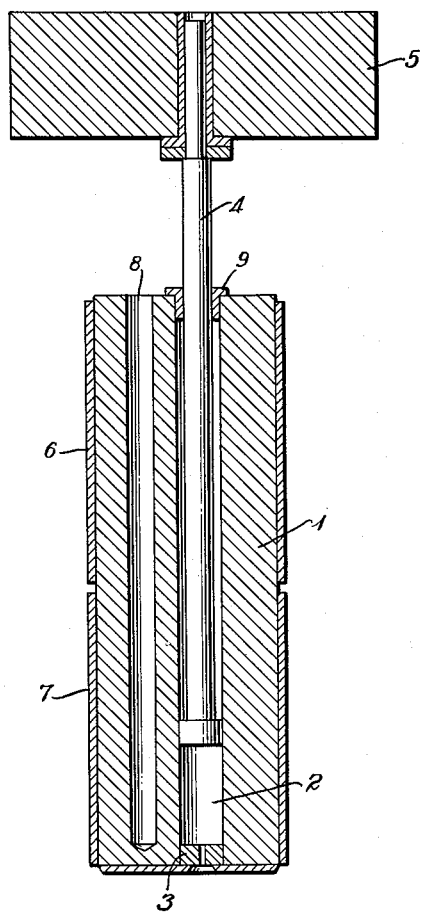
INVENTOR
JAN LODEWIJK VOIGT
BY *Stevens, Davis, Miller and Mosher*
ATTORNEYS United States Patent Office 2,996,474
Patented Aug. 15, 1961

2,996,474
PROCESS OF MOLDING A MIXTURE OF AT LEAST TWO FIBER FORMING LINEAR CONDENSATION PRODUCTS, AT LEAST ONE OF WHICH PRODUCTS CONTAINS A HIGH TEMPERATURE THICKENING AGENT
Jan Lodewijk Voigt, Arnhem, Netherlands, assignor to N.V. Onderzoekingsinstituut Research, Arnhem, Netherlands, a corporation of the Netherlands
Filed Apr. 10, 1956, Ser. No. 577,278
Claims priority, application Netherlands Apr. 27, 1955
5 Claims. (Cl. 260—42)

This invention relates to the manufacture of shaped objects having a flamed or marbled pattern from high molecular weight linear polycondensation products by means of injection molding.

One of the principal objects of the present invention is to provide a new and improved method for the manufacture of shaped products having a flamed or marbled appearance from high molecular weight linear polycondensation products by means of injection molding wherein the difficulties due to rapid changes in plasticity of these polymeric materials on melting is avoided. A further object of the invention is to provide new and improved shaped products having a flamed or marbled appearance that are prepared by the injection molding of high molecular weight linear polycondensation products such as, for example, linear superpolyamides.

The manner in which these and other objects and features of the invention are attained will appear more fully from the following description thereof, in which reference is made to typically and preferred procedures in order to indicate more fully the nature of the invention, but without intending to limit the invention thereby.

As pointed out in the prior copending U.S. application Serial No. 514,666, filed June 10, 1955, by Jacob C. F. Kessler et al., now U.S. Patent No. 2,959,570, it was already known that the manufacture of certain self-supporting shaped products from linear polycondensation products by means of extrusion gave rise to difficulties due to the rapid change in plasticity of those polymeric materials on melting, whereas such difficulties did not arise when polymeric substances such as cellulose acetate and polyvinyl chloride were shaped in a corresponding manner.

Attempts had been made to meet those difficulties by means of specially constructed extrusion presses. However, that solution was found to be less attractive for the processing industry, because it necessitated procuring special equipment at heavy cost.

According to the invention of the aforesaid Kessler et al. application, it was found possible to prepare an extrusion material from high molecular weight polyamides and similar polycondensation products that may be used with satisfactory results in the usual extrusion devices by the use of certain additives, the properties of the formed products practically not deviating from those of products manufactured from polyamides and the like polymeric substances without admixture of additives. In accordance with the disclosure of the prior Kessler et al. application, to the polymers to be extruded there is added such a proportion of a substance, up to a maximum of 2% by weight of the polymer, which substance in the same proportion so thickens in molten condition the same polymer containing up to a maximum of 2.5% by weight of water-soluble components, that the ratio between the flow rate determined by means of the extrusion plastometer according to A.S.T.M. D. 1238–52T of the unmixed polymer and the flow rate of the polymer mixed with the thickening agent amounts to at least 1.5.

This definition involves the content of a maximum of 2.5% by weight of water-soluble components in the polymer of which the flow rate ratio is to be determined, in order to arrive at the most accurate indication of the substances to be used according to the process. As a rule, the linear polycondensation product to be processed will contain less than 2.5% by weight of water-soluble substances. In that case the flow rate ratio may at once be determined with that substance. However, if the polymer contains more than 2.5% by weight of water-soluble substances, as may be the case with polycaprolactam, then it is advisable to wash such polymeric substances prior to determining the flow rates. The substances (additives) for which the flow rate ratio is at least 1.5 will be preferably added to polymers also containing less than 2.5% by weight of water-soluble components. However, this is not necessary. In many cases these additives may also be used in polymers having a higher content of water-soluble substances.

In order to explain the matter of flow rate more fully it should be stated that this flow rate determination is preferably carried out in an apparatus such as that shown in the accompanying drawing in longitudinal section, the description of this apparatus being taken from the aforesaid application.

This apparatus comprises a metal cylinder 1 having a length of 16.5 cm. and a diameter of 5 cm. in which a continuous cylindrical bore 2 having a diameter of 1 cm. is provided. In the lower portion of said bore a nozzle 3 having an orifice of 0.21 cm. is tightly fitted. The bore 2 also accommodates a plunger 4 whose weight is 0.1 kg., said plunger being adapted to move freely up and down within the bore. On this plunger a weight 5 of 2.06 kg. may be placed. The metal cylinder 1 is surrounded by two electric heating elements 6 and 7. A space 8 is provided in said cylinder for receiving a thermometer. The plunger 4 passes through a suitable packing gland 9.

When the determination is carried out the metal cylinder 1 with the plunger 4 removed is first heated by means of the heating elements 6 and 7 to a temperature of 240° C., whereafter 7 g. of the polymer to be tested are introduced into the bore 2 followed by the insertion of the plunger. The plunger is kept without a load on the polymer for 3 minutes, but from time to time it is pressed down to promote de-aeration of the polymer. Thereupon the weight 5 is placed on the plunger. After 2 minutes this plunger should have sunk halfway down the bore. If necessary, an additional pressure is exerted on the plunger to bring it to this position. After passing this point the polymer is given 2 minutes to flow out freely. Thereafter, the polymer stream is cut off along the nozzle whereupon during the next succeeding 3 minutes the polymer then flowing out is separately collected, weighed and converted to the quantity which would have flowed out during 10 minutes. This amount expressed in grams is the flow rate.

As examples of substances which exert the desired thickening action may be mentioned the following.

Esters of an acid of phosphorus substituted or non-substituted by halogen, namely alkyl phosphites, such as tributyl phosphite, diethyl phosphite, dibutyl phosphite, and trichloroethyl phosphite, aryl phosphites, such as triphenyl phosphite, alkyl or aryl phosphates substituted or non-substituted by halogen such as diethyl β-chloroethyl phosphate, phenyl di-p-chlorophenyl phosphate, trichloroethyl phosphate, trichloropropyl phosphate, and ethyl di-β-chloroethyl phosphate. Other suitable additives include di-chloromethylene-m-xylene, polyallyl chloride, tetraethyl pyrophosphate, di(chloroethyl) sulphate, tri-n-butylborate, p-xylene dichloride, glycerol trichloroacetate, di - bromomethylene m - xylene, p-di(epoxy-propoxy) benzene, di-β-chloroethyl vinylphosphonate, 2,4-dimethylol phenol, 2,4-dimethylol 6-chlorophenol and terephthalic dialdehyde. Also mixtures of these substances may be used.

All the foregoing substances reduce the flow rate of the molten polymer whereas at the aforesaid concentration of less than 2% by weight, based on the polymer, they do not soften the polymer at room temperature. They may therefore be regarded as high temperature thickening agents which have no appreciable effect on the polymer at ordinary or room temperature.

The high molecular weight polycondensation products which are very satisfactory for use in the present process are those which are obtained when polymerizing ε-caprolactam and in which the initially-formed polymerization product is washed out to such a degree that the content of low molecular weight water-soluble components remaining therein amounts to less than 2.5% by weight, based on the polymer.

In the polymerization process one generally uses phosphoric acid or acetic acid as a stabilizer and the polymerization is carried through so far that the specific viscosity of the final polycaprolactam product measured in a solution of 1% by weight in 90% by weight of formic acid lies between 1.1 and 1.7 and preferably between 1.3 and 1.7. Washing out the low molecular weight water-soluble components is generally carried out until the content of those components is between 1.5 and 2.5% by weight, based on the polycaprolactam.

In addition, however, polyamides obtained from superpolyamide-forming organic diamines and dicarboxylic acids are suitable for processing in accordance with the present invention. The linear polyamides to which the present invention relates may also be defined as in the well-known publication by R. L. Wakeman, "The Chemistry of Commercial Plastics," Reinhold Publishing Co., 1947, page 257, as ". . . any long-chain synthetic polymeric amide which has recurring amide groups as an integral part of the main polymer chain . . ." Linear polyurethanes may also be employed in like manner, such polyurethanes being prepared in well-known manner—cf. Rinke et al. U.S. Patent No. 2,511,544 and Catlin U.S. Patent No. 2,284,637.

The foregoing general description, taken from the aforesaid Kessler et al. application, relates to processes for the production of shaped objects of other than flamed or marbled appearance. The production of the latter type of shaped objects poses other and still more difficult problems.

The manufacture of shaped objects of flamed or marbled appearance according to the injection molding method was of course broadly known prior to this time. It has already been suggested, for instance, to granulate separately two kinds of cellulose acetate of different colors and of different viscosities, to mix the granules thus obtained, and finally to process those granules to shaped objects having a flamed or marbled appearance according to conventional injection molding methods.

Attempts have been made to apply this known processing method also in the case of polyamides and the like polycondensation products, but this did not lead to satisfactory results because the various polyamides or other polycondensation products always blended too freely, thus making it impossible to achieve a satisfactory flamed or marbled appearance.

It was surprisingly found that thickening agents such as those mentioned above make it possible to manufacture articles having a flamed or marbled pattern from linear polycondensation products, this flamed pattern being well adapted to be brought even more to the fore by means of dyes. In this way it is possible, for instance, to manufacture shaped objects resembling tortoise-shell.

According to the present invention, therefore, a mixture of at least two groups of granules consisting of linear polycondensation products is processed according to the injection molding method, the granules of at least one group containing an amount, up to a maximum of 2% by weight, of a substance which thickens in molten condition, when present in the same proportion, one and the same polymer containing a maximum of 2.5% by weight of water-soluble components in such a manner that the ratio between the flow rate determined by means of the extrusion plastometer according to A.S.T.M. D. 1238–52T of the same, but unmixed, polymer and the flow rate of the polymer mixed with the thickening agent amounts to at least 1.5.

In order to obtain products having a flamed or marbled appearance one will generally start with granules of polyamide or other linear polycondensation product of which one portion contains and the other portion does not contain a thickening agent or agents. In that case a weight ratio between the granules mixed with thickening agents and the unmixed granules, suitable for obtaining the required flame or marbled effect, lies between the values 1:40 and 1:50, respectively.

The mixing of the selected portion of polymer and the thickening agent may be carried out in various ways. Thus, it is desirable to mix these substances prior to supplying them to the injection molding device. According to a preferred embodiment of the process according to the present invention a selected portion of the polymer granules are rolled for a short time, for instance for about 30 seconds, with the required amount of the thickening agent. In this way the polymer granules are covered with a thin layer of the thickening agent and a polymeric material is obtained which may, after suitable admixture with the unmixed polymer (i.e., polymer to which no thickening agent has been added), be processed in any known injection molding machine. It is also possible to add the thickening agent by feeding a plurality of separate streams of the polymer to the injection molding device while introducing the thickening agent to at least one stream, but in any event to at most all but one stream, of the two or more streams fed thereto, so that the mixture of the polymer and thickening agent is obtained en route through the molding device.

In order to indicate still more fully the nature of the present invention, the following example of typical procedures is set forth, it being understood, however, that this description is presented by way of illustration only, and not as limiting the scope of the invention.

*Example*

Granules of a linear polyamide having a specific viscosity of 1.4, formed from the polymerization product of ε-caprolactam, and obtained by polymerization in the presence of 0.1% by weight of phosphoric acid as a stabilizer and containing about 2% by weight of water-soluble components, were rolled for 30 seconds with 0.5% by weight of tributylphosphite, 1% by weight of cadmium yellow OZ, 1% by weight of cadmium red 215 and 0.5% by weight of carbon black and were thereupon fed into a screw extruder. The thin strand extruded from the extruder was subdivided into granules of 1.5 mm. The flow rate ratio of the product thus obtained was 3.0. These granules where then thoroughly mixed with similar linear polyamide granules of 3 mm. which had been rolled with 0.005% by weight of Geigy yellow 4, but which did not contain any thickening agent, in a ratio of 1:50, respectively.

The mixture thus obtained was thereupon processed according to conventional injection molding techniques to molded articles having a desirable tortoise-shell appearance.

While a specific example of a preferred method embodying the present invention has been set forth above, it will be understood that many changes and modifications may be made in the method of procedure without departing from the spirit of the invention. It will therefore be understood that the example cited and the particular proportions and methods of operation set forth above are intended to be illustrative only, and are not intended to limit the scope of the invention.

What is claimed is:

1. A process for the manufacture of objects having a flamed pattern according to the injection molding method, consisting of mixing at least two different groups of granules consisting of high molecular weight fiber-forming linear polycondensation products of the same chemical nature, the granules of at least one but less than all the groups containing in physical admixture therewith a small but effective amount, up to a maximum of 2% by weight of said polycondensation product, of a high temperature thickening agent selected from the class consisting of tributyl phosphite, diethyl phosphite, dibutyl phosphite, trichloroethyl phosphite, triphenyl phosphite, diethyl β-chloroethyl phosphate, phenyl di-p-chlorophenyl phosphate, trichloroethyl phosphate, trichloropropyl phosphate, ethyl di-β-chloroethyl phosphate, tetraethyl pyrophosphate, and di-β-chloroethyl vinylphosphonate, said high temperature thickening agent when present in the same proportion having no appreciable effect on said polycondensation product at ordinary room temperature but so thickening, in molten condition, the same polycondensation product containing up to a maximum of 2.5% by weight of water-soluble components, that the ratio between the flow rate, determined by means of the extrusion plastometer according to A.S.T.M. D. 1238–52T, of the same, but unmixed, polycondensation product and the flow rate of the polycondensation product mixed with the high temperature thickening agent amounts to at least 1.5, said linear polycondensation products being selected from the class consisting of long-chain synthetic linear polyamides which have recurring amide groups as an integral part of the main polymer chain and linear polyurethanes, and then subjecting to injection molding at temperatures above their melting points the resulting physical mixture of granules of said polycondensation product having no high temperature thickening agent and granules of said polycondensation product having said high temperature thickening agent in admixture therewith, thereby obtaining injection-molded products having a flamed pattern while at the same time at least greatly minimizing difficulties due to rapid changes in plasticity of said high molecular weight linear polycondensation products per se on melting.

2. A process according to claim 1 wherein the high molecular weight linear polycondensation product is a polyamide.

3. A process according to claim 2, wherein in the mixture of granules subjected to injection molding the weight ratio between the granules mixed with thickening agent and the unmixed granules lies between 1:40 and 1:50, respectively.

4. A process according to claim 2 wherein a portion of the polymer contains about 0.5% by weight of tributyl phosphite as the thickening agent.

5. A process according to claim 2 wherein a portion of the polymer contains about 0.5% by weight of di-β-chloroethyl vinylphosphonate as the thickening agent.

References Cited in the file of this patent

UNITED STATES PATENTS

| | | |
|---|---|---|
| 2,353,457 | Goessling | July 11, 1944 |
| 2,364,024 | Hayes | Nov. 28, 1944 |
| 2,377,231 | Hayes | May 29, 1945 |
| 2,493,597 | Rothrock et al. | Jan. 3, 1950 |

OTHER REFERENCES

Ser. No. 301,162, Hopff et al. (A.P.C.), published Apr. 27, 1943.